United States Patent [19]

Wilkinson

[11] 4,353,767

[45] Oct. 12, 1982

[54] METHOD OF MANUFACTURING AN OPTICAL READING DISC

[75] Inventor: Richard L. Wilkinson, Torrance, Calif.

[73] Assignee: Discovision Associates, Costa Mesa, Calif.

[21] Appl. No.: 275,270

[22] Filed: Jun. 19, 1981

Related U.S. Application Data

[60] Continuation of Ser. No. 121,852, Feb. 15, 1980, abandoned, which is a division of Ser. No. 67,657, Aug. 20, 1979, Pat. No. 4,264,911.

[51] Int. Cl.³ .......................... B29C 19/00; C09J 5/02
[52] U.S. Cl. ................................. 156/245; 156/304.2; 156/308.4; 369/175; 346/135.1; 346/137
[58] Field of Search ............... 156/245, , 292, 228, 156/304.2, 308.4, 318, 210, 108; 179/100.1 G, 100.3 K, 100.3 V; 346/1.1, 137, 135.1; 369/175, 109, 100, 284; 358/128.6; 264/250, 268, 296; 350/DIG. 1

[56] References Cited

U.S. PATENT DOCUMENTS

| 2,703,486 | 3/1955 | Ford | 156/292 |
| 2,920,682 | 1/1960 | Lindberg | 156/292 |
| 3,684,614 | 8/1972 | Lemelson | 156/292 |
| 4,038,663 | 7/1977 | Day et al. | 346/1.1 |
| 4,074,282 | 2/1978 | Balas, Jr. et al. | 346/135 |

FOREIGN PATENT DOCUMENTS 2935859  3/1980  Fed. Rep. of Germany ...... 369/275

Primary Examiner—Edward C. Kimlin
Assistant Examiner—Louis Falasco
Attorney, Agent, or Firm—Ronald J. Clark

[57] ABSTRACT

A direct-read-after-write optical recording disc having a pair of transparent, disc-shaped members, each being formed with integral inner and outer ring-shaped bosses on one of its sides. A thin recording layer of a light-sensitive material is coated on each disc-shaped member, in a shallow annular recess formed between its two ring-shaped bosses, and the two members are disposed in a coaxial relationship, with their respective bosses in abutment with each other, whereby the two recording layers are located within a sealed, annular chamber.

5 Claims, 3 Drawing Figures

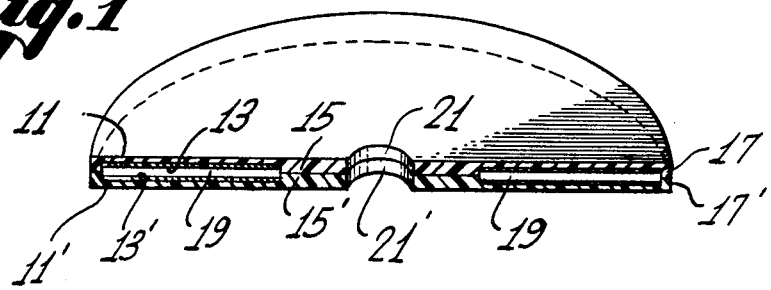
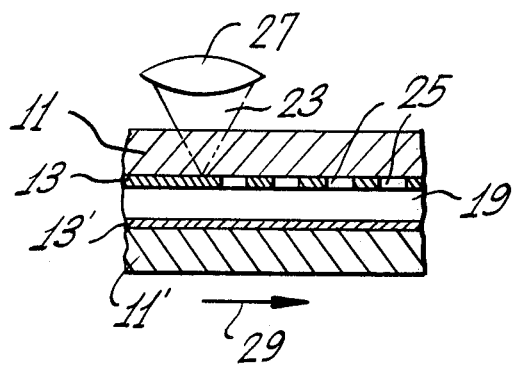
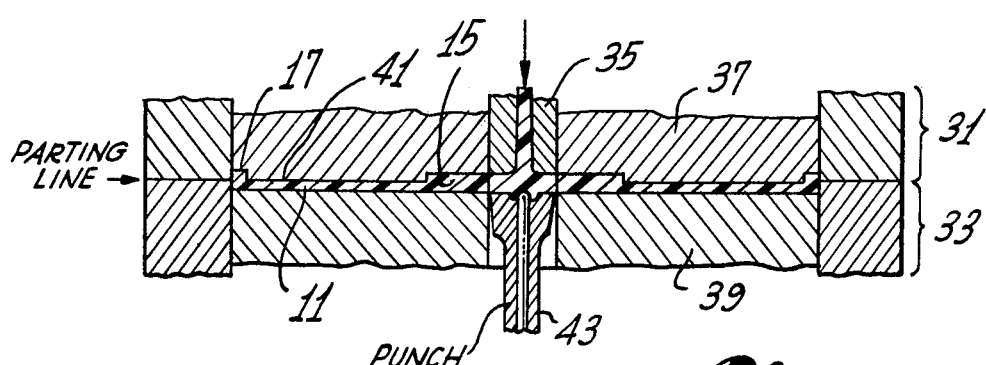

METHOD OF MANUFACTURING AN OPTICAL READING DISC

This is a continuation of application Ser. No. 121,852, filed Feb. 15, 1980, abandoned, which in turn is a division of application Ser. No. 67,657, filed Aug. 20, 1979, now U.S. Pat. No. 4,264,911.

BACKGROUND OF THE INVENTION

This invention relates generally to disc-shaped recording media, and, more particularly, to direct-read-after-write (DRAW) optical recording discs.

Optical recording discs of this particular type typically include a pair of thin, transparent disc-shaped members arranged in a spaced, coaxial relationship, with a thin layer of a special light-sensitive material overlaying the inwardly-facing side of at least one of the two members. The light-sensitive recording layer is normally located within an annular chamber, to protect it from any adverse environmental conditions that might be present and, also, from possible damage due to manual handling. The light-sensitive material normally comprises a material that exhibits a change in its optical characteristics, such as melting or evaporating to produce a microscopic hole, whenever a beam of light of sufficient intensity, is focused thereon. Suitable materials include, for example, metals such as bismuth or titanium, semiconductors such as tellurium, selenium, or arsenic selinide, or dielectric materials such as silicon dioxide in combination with a suitable dye.

An information signal is recorded in the optical disc by focusing onto the light-sensitive recording layer a beam of light, modulated in intensity in accordance with the information signal, as the disc is rotated in a prescribed fashion. The intensity of the beam is alternately greater than and less than a predetermined threshold, at which melting or evaporation of the light-sensitive layer occurs, whereby a sequence of spaced holes, representative of the information signal, is formed in the layer, in a succession of substantially circular and concentrically arranged recording tracks. The recorded disc can then be read immediately, without any intermediate processing of the disc.

One example of a DRAW optical recording disc is disclosed in U.S. Pat. No. 4,074,282, issued in the name of C. Balas, Jr. et al and entitled "Radiation-Sensitive Record with Protected Sensitive Surface". The record includes a pair of planar, disc-shaped members that are spaced from each other by a pair of separate, ring-shaped spacers or seals, one located adjacent the outer peripheries of the two members and the other located near their respective centers. A planar, annular chamber is therefore formed between the two disc-shaped members, and a light-sensitive layer is coated on the inwardly-facing surface of each member, within the chamber.

Although the aforedescribed disc-shaped record has proven generally effective as a record medium capable of withstanding adverse environmental conditions and handling, it is felt that the record includes more elements than are necessary to provide equally satisfactory performance. Moreover, difficulties can sometimes arise in aligning the two disc-shaped members along with the two separate, ring-shaped seals, in a precise coaxial relationship, during assembly of the record. Additionally, difficulties can arise in determining the precise annular portions of each disc-shaped member, on which the light-sensitive material is to be coated.

It will therefore be appreciated that there is a need for a disc-shaped optical recording medium in which a light-sensitive layer for recording information is adequately protected from adverse environmental conditions and from handling, without requiring an excessive number of elements, and without presenting difficulties during its assembly. The present invention fulfills this need.

SUMMARY OF THE INVENTION

The present invention is embodied in a DRAW optical recording disc that includes a pair of thin, disc-shaped members disposed in a confronting, coaxial relationship. Additionally, a thin layer of light-sensitive material overlays the inwardly-facing or confronting surface of at least one of the two members, to function as a medium in which information can be recorded and read using optical techniques. In accordance with the invention, each of the two disc-shaped members includes inner and outer integral, ring-shaped bosses projecting upwardly from the confronting surface thereof, and the two disc-shaped members are disposed with their respective inner and outer bosses in abutment with each other, whereby an annular chamber is formed therebetween, with the layer of light-sensitive material defining one side of the chamber. Additionally, at least one of the two disc-shaped members is transparent, whereby an information-bearing beam of light can be directed therethrough onto the light-sensitive layer, to record information therein.

More particularly, the two disc-shaped members are substantially planar and are identical in shaped. Each member is produced in a molding apparatus of a type that punches, simultaneously, a centrally-located hole, whereby the resultant record can be conveniently used by conventional record/playback apparatus. The inner and outer integral, ring-shaped bosses are preferably located adjacent the central hole and the outer periphery of the disc, respectively. The light-sensitive recording layer is vacuum deposited on the confronting surface of one disc-shaped member, in the shallow recess formed between its inner and outer bosses. Additionally, the two disc-shaped members are bonded to each other using, for example, a solvent bonding technique, wherein a solvent is placed on the faces of the respective bosses and the members are held in compressive engagement until the solvent has dried.

For double-sided recording media, both disc-shaped members are transparent and a separate layer of light-sensitive material overlays the confronting surface of each member, between the inner and outer ring-shaped bosses thereof. Information is recorded in each recording layer by focusing an intensity-modulated beam of light onto the underside of the layer, through its underlaying transparent disc-shaped member.

Other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

FIG. 1 is a partial sectional view of a disc-shaped optical recording medium in accordance with the present invention, the medium having two light-sensitive recording layers therein;

FIG. 2 is a developed sectional view (not to scale) of the recording medium of FIG. 1, showing, in schematic form, an intensity-modulated beam of light being focused onto one of the light-sensitive recording layers, to form a substantially circular recording track therein; and FIG. 3 is a sectional view of a portion of a molding apparatus for producing each of the two disc-shaped members in the recording medium of FIG. 1.

DESCRIPTION OF THE PREFERRED EMBODIMENT

Referring now to the drawings, and particularly to FIG. 1, there is shown a disc-shaped optical recording medium that includes a pair of transparent disc-shaped members 11 and 11' arranged in a confronting, coaxial relationship. The confronting or inwardly-facing side of each member is overlayed by a recording layer 13 or 13' of a special light-sensitive material that is suitable for optically recording an information signal.

In accordance with the invention, each of the disc-shaped members 11 or 11' includes inner and outer integral, ring-shaped bosses 15 and 17 or 15' and 17', respectively, projecting upwardly from the confronting side thereof, to form a shallow annular recess therebetween. The inner boss 15 or 15' is disposed adjacent the center of the member and the outer boss 17 or 17' is disposed adjacent the outer periphery of the member. Also, the light-sensitive recording layer 13 or 13' is deposited in a shallow, annular recess formed between the two bosses.

The two disc-shaped members 11 and 11' are identical in shape and are disposed in a coaxial relationship, with their respective inner and outer bosses 15 and 17 or 15' and 17' suitably bonded to each other. This forms a double-sided record medium wherein the two light-sensitive recording layers 13 and 13' are located within an hermetically-sealed annular chamber 19, where they are protected from any adverse environmental conditions that might be present. Assembly of the record medium thus requires the bonding of just two separate elements, i.e. the two disc-shaped members, thereby avoiding any difficulties that otherwise might arise when a greater number of elements must be bonded in a precise, coaxial relationship.

More particularly, each of the two disc-shaped members 11 or 11' is molded of polymethylmethacrylate and includes a circular, centrally-located hole 21 or 21' to facilitate use of the record disc in conventional recording and playback apparatus. The inner ring-shaped boss 15 or 15' is located adjacent the central hole and the outer ring-shaped boss is located adjacent the outer periphery of the member. The portion of each disc-shaped member overlayed by its corresponding light-sensitive layer 13 or 13' is preferably about 1.2 millimeters in thickness and the integral bosses each have a thickness of about 0.3 millimeters, whereby the overall thickness of the annular chamber 19 is about 0.6 millimeters.

The light-sensitive material that comprises the two recording layers 13 or 13' can advantageously comprise any of a number of suitable materials, including metals, semiconductors, or dielectrics, which exhibit some change in optical characteristics, such as melting or evaporating to form microscopic holes, whenever heated by a predetermined amount. Preferably, the material comprises a mixture of the semiconductors tellurium and selenium, which is vacuum deposited on the recess in each disc-shaped member, to a uniform thickness of about 300 A°. The inner and outer ring-shaped bosses 15 and 17, respectively, are suitably masked to ensure that the recording material is deposited only on the recess located therebetween.

The recording disc of FIG. 1 is suitable for use with recording apparatus of a type that focuses onto one of the recording layers 13 or 13' a beam of light 23 (FIG. 2), modulated in intensity in accordance with the information signal to be recorded, as the disc is rotated in a prescribed fashion. This produces a sequence of space holes 25 in the recording layer, representative of the information signal, in a succession of substantially circular and concentrically arranged recording tracks. As shown in FIG. 2, which is a developed sectional view of the medium, showing such a recording tracks, the intensity-modulated beam of light is focused by a lens, shown schematically at 27, through the underlaying disc-shaped member 11 onto the light-sensitive layer 13, as the disc is moved at a prescribed speed in the direction of an arrow designated by the numeral 29.

Each of the two disc-shaped members 11 and 11' can be conveniently produced in a molding apparatus of a type similar to that disclosed in a copending and commonly-assigned U.S. patent application Ser. No. 031,205, filed in the name of J. R. Holmes and entitled "Apparatus for Producing Centrally Apertured Record Discs". As shown in FIG. 3, the molding apparatus includes a pair of mold halves 31 and 33 that are reciprocally movable between a closed position (as shown), wherein the parting line is closed and an annular cavity is formed for receiving molten polymethylmethacrylate through a sprue bushing 35, and an open position, wherein the two mold halves are spaced apart, to permit removal of the molded disc-shaped member.

The annular cavity of the molding apparatus is defined by a pair of disc-shaped, machined plates 37 and 39. The plate 39 that forms the outwardly-facing or non-confronting surface of the disc-shaped member 11 or 11' is substantially planar, and the plate 37 that forms the inwardly-facing or confronting surface of the member includes an annular ring-shaped boss 41 having a thickness of approximately 0.3 millimeters, for forming the inner and outer ring-shaped bosses 15 and 17, respectively. The upper surface of the boss 41 is preferably machined to an extremely smooth finish, whereby the resulting inwardly-facing surface of the molded member, on which the recording layer 13 or 13' is deposited, is correspondingly smooth. Additionally, the centrally-located hole 21 in the molded member is formed by a punch 43 that is actuated after the sprue bushing 35 has been retracted, but while the parting line is still closed and the molded member is still being held securely between the two machined plates.

The respective inner and outer ring-shaped bosses 15 and 17 on the two disc-shaped members 11 and 11' that comprise the record disc are secured to each other using a conventional solvent bonding technique. In this technique, a solvent such as butyl acetate is placed on the bosses, after which the two members are positioned in a coaxial relationship, with their respective bosses held in compressive engagement until the solvent has evaporated. This yields an effective hermetic seal for protecting the two light-sensitive layers 13 and 13' from handling and from any adverse environmental conditions that may be present.

It will be appreciated from the foregoing description that the present invention provides an improved directread-after-write optical recording disc that includes a pair of transparent disc-shaped members, each having a pair of spaced, integral, ring-shaped bosses, with a light-sensitive recording layer coated on the annular recess formed therebetween. The respective bosses of the two members are suitably bonded together to secure the members in a coaxial, confronting relationship, to form a recording disc in which the two light-sensitive recording layers are located within an hermetically-sealed annular chamber.

Although the invention has been described in detail with reference to its presently preferred embodiment, it will be understood by one of ordinary skill in the art that various modifications can be made, without departing from the spirit and scope of the invention. Accordingly, it is not intended that the invention be limited, except as by the appended claims.

I claim:

1. A method of making an optical recording disc, comprising the steps of:

molding two thin, disc-shaped members, each having an inner integral ring-shaped boss located at the center of the member and an outer integral ring-shaped boss concentric with said inner boss and located at the outer periphery of said member and projecting upwardly from a confronting side thereof and forming a shallow, annular recess therebetween wherein the inner and outer bosses of each member both have uniform thicknesses and planar upper surfaces parallel to the plane of the member, and wherein the two members are substantially identical in shape and at least one of the two members is transparent;

said step of molding including a step of forming a circular hole in the center of each of the two disc-shaped members, concentric with its inner and outer bosses;

coating the annular recess portion of one of the two disc-shaped members with a thin recording layer of light-sensitive material; and bonding together the pair of disc-shaped members in a coaxial relationship, with their respective inner and outer bosses in abutment with each other, thereby producing the optical recording disc.

2. A method as defined in claim 1, wherein:

the two disc-shaped members produced in said step of molding are both transparent and substantially identical in shape; and said method further includes a step of coating the annular recess portion of the other of disc-shaped members with a thin recording layer of light-sensitive material, whereby information can be recorded in each of the two recording layers by directing an intensity-modulated beam of light onto the layer, through the underlying, transparent disc-shaped member.

3. A method as defined in claim 2, wherein in said steps of coating a light-sensitive material on the two disc-shaped members, the material is vacuum deposited to a substantially uniform thickness over the entire recess portion of each member.

4. A method as defined in claim 1, wherein said step of bonding includes a step of placing a solvent on the inner and outer ring-shaped bosses of both of the two disc-shaped members.

5. A method of making an optical recording disc, comprising the steps of:

molding two thin, disc-shaped members, each having an inner, integral ring-shaped boss located at the center of the member and an outer, integral ring-shaped boss concentric with said inner boss and located at the outer periphery of said member and projecting upwardly from a confronting side thereof and forming a shallow, annular recess therebetween, wherein the inner and outer bosses of each member both have uniform thicknesses and planar upper surfaces parallel to the plane of the member, and wherein the two members are transparent and substantially indentical in shape;

said step of molding includes a step of forming a circular hole in the center of each of the two disc-shaped members, concentric with its inner and outer bosses, to facilitate use of the optical recording disc with recording apparatus;

vacuum depositing a thin recording layer of light-sensitive material onto the annular recess portions of each of the two disc-shaped members, said recording layers both having a substantially uniform thickness; and solvent bonding together the pair of disc-shaped members in a coaxial relationship, with their respective inner and outer bosses in abutment with each other, thereby producing an optical recording disc in which information can be recorded in each of the two recording layers by directing an intensity-modulated beam of light onto the layer, through the underlying, transparent disc-shaped member.

* * * * *